United States Patent [19]

Kallmeyer et al.

[11] Patent Number: 5,063,300
[45] Date of Patent: Nov. 5, 1991

[54] METHOD AND APPARATUS FOR DETERMINING LINE CENTERS IN A MICROMINIATURE ELEMENT

[75] Inventors: Michael Kallmeyer, Boeblingen; Dietmar Wagner, Stuttgart, both of Fed. Rep. of Germany

[73] Assignee: International Business Machines Corporation, Armonk, N.Y.

[21] Appl. No.: 546,216

[22] Filed: Jun. 28, 1990

[30] Foreign Application Priority Data

Jul. 8, 1989 [DE] Fed. Rep. of Germany ..... 89112541

[51] Int. Cl.$^5$ ............................................. G01N 21/86
[52] U.S. Cl. ..................................... 250/561; 250/557
[58] Field of Search ............... 250/557, 560, 561, 233, 250/202, 234–236; 356/384, 387, 399, 400, 401, 375

[56] References Cited

U.S. PATENT DOCUMENTS

| | | | |
|---|---|---|---|
| 4,373,816 | 2/1983 | Laib | 250/561 |
| 4,642,468 | 2/1987 | Tabata et al. | 250/557 |
| 4,814,624 | 3/1989 | Veltze | 250/560 |
| 4,994,990 | 2/1991 | Fujita et al. | 250/560 |

Primary Examiner—David C. Nelms
Assistant Examiner—Michael Messinger
Attorney, Agent, or Firm—Francis J. Thornton

[57] ABSTRACT

Method and an apparatus for determining line centers in a microminiature element such as on a semiconductor wafer or a mask having linewidths and other spacings below the one micron range. The invention uses, two focussed laser beams which are directed across a line on the element, both beams being illuminated successively with a distance therebetween below the classic resolving power. A portion of the incident beam and a portion of the beam reflected from the line is conducted to respective detectors which respectively generate measurement and reference signals. These signals are treated to eliminate high frequency noise components therein. Subsequently, the filtered measurement and reference signals are digitized and synchronously processed to provide two sine shaped curves whose intersection point corresponds to the center of the scanned line.

10 Claims, 4 Drawing Sheets

METHOD AND APPARATUS FOR DETERMINING LINE CENTERS IN A MICROMINIATURE ELEMENT

BACKGROUND OF THE INVENTION

1. Field of the Invention

The present invention relates to a technique utilized in the fabrication of microminiature devices and, more particularly, to a method and an apparatus for determining the center of lines whose width or spacing is below the one micron range.

2. Prior Art

Linewidth measurement and the determination of line centers is well known in the integrated circuit industry for process characterization and tool evaluation. In particular, this is valuable in the evaluation of lithography systems or in photoresist or etching processes. However, measurement techniques for use with lines whose width or separation in the submicron range have not been known.

EP-A-0013 325 describes an optical system that is particularly adapted for accurate, nondestructive measurement of surface features encountered in semiconductor manufacturing. A spot of laser light is focussed on the surface of the object and then scanned across the features of interest. Light reflected from the edges and surface of the object is detected by photomultipliers which generate signals with peaks representing the edges. Linewidths or distances are then obtained by computing the location differences between the peaks appearing in the multiplier signals.

PTB-Mitteilungen Forschen+Pruefen, Vol. 95, 1/85, pp. 1-10 discloses the determining of edges on lines having a linewidth in the range of one micron. The edges are determined by two focussed laser beams on the object which beams are illuminated successively. A photo detector receives the light reflected from the edges of the lines and the surfaces of the object and generates an electrical signal. The linewidths are obtained by computing locations of signal peaks created by reflection of the beam on the line edges. This method and apparatus are not suitable for determining lines in the submicron range because the shape and the small distance between the signal peaks increases the measurement error to a high degree. Further, the error is negatively influenced by the signal processing which high frequency errors.

The present invention is intended to remedy these drawbacks and describes a method and an apparatus for determining accurately the width and midpoint of lines in the submicron range in real time.

SUMMARY OF THE INVENTION

The present invention illuminates the line being measured by laser beams having a distance therebetween below the classic resolving power (0.61×wavelength/numerical aperture). Desirably the distance between the spots is about 0.2 micron which is obtained by 0.4×wavelength/numerical aperture as described in PTB-Mitteilungen. The illumination can be accomplished either by using two different laser beams whose intensity is oscillated, i.e. of one beam has it intensity increased while the other beam has its intensity decreased, or by using only one beam which oscillates between two locations.

Each line scanned by the beams generate reflections which are detected to generate an electrical measurement signal.

The obtained measurement signal comprises a DC component, which varies with the reflectivity of the object, superposed on an AC component, generated by the oscillation of the two laser beams. The AC component of the signal contains the information which can be used to determine the line center of the scanned line. Thus the DC component thus has to be eliminated.

Additionally, any high frequency noise components such as those produced by the laser and the scanning itself must also be eliminated in order to provide an appropriate measurement signal. This is accomplished by passing the signal through a tuned amplifier.

The maximum and minimum values of the measurement signal for each scanned line are then digitized.

With the digitized values, two sine shaped curves, for each scanned line, are generated and represent the envelope of the AC component signal. They are formed by maximum/minimum and minimum/maximum values, respectively.

With conventional digital processing techniques the intersection point of the two sine shaped curves is computed with the center of the scanned line corresponding to the intersection point of the two curves.

The resultant measurement can be improved by an additional digital filtering of the measurement signal in order to eliminate further noise.

According to a different embodiment of the invention an additional reference signal can be generated which is considered with the processing of the digital values of the measurement signal. This reference signal is preferably processed in parallel to the measurement signal, to compute the line center.

The use and digital processing of an additional reference signal permits a further decrease of the measurement error due to the elimination of the laser generated noise. Thus, it is possible to use a laser which has a high noise level as this noise can be electronically eliminated.

A further reduction of measurement errors can be obtained by placing a beam splitter in the optical path of the laser beams to provide the light for the reference signal. By inserting the beam splitter in the optical path with an inclination which is equal to the Brewster Angle, the light of one laser beam is completely transmitted without reflection while a part (about 15%) of the light of the other laser beam is reflected. This reflected part is used to develop a reference signal.

The measurement and reference signals can be received at the same time if tuned amplifiers with the same time constant are used.

In another embodiment of the invention any errors generated by the laser scanner apparatus can be eliminated.

These and other advantages and objects of the present invention can be taken from the following description of preferred embodiments in accordance with the accompanying drawings, in which

DETAILED DESCRIPTION OF THE INVENTION

Figure 1:
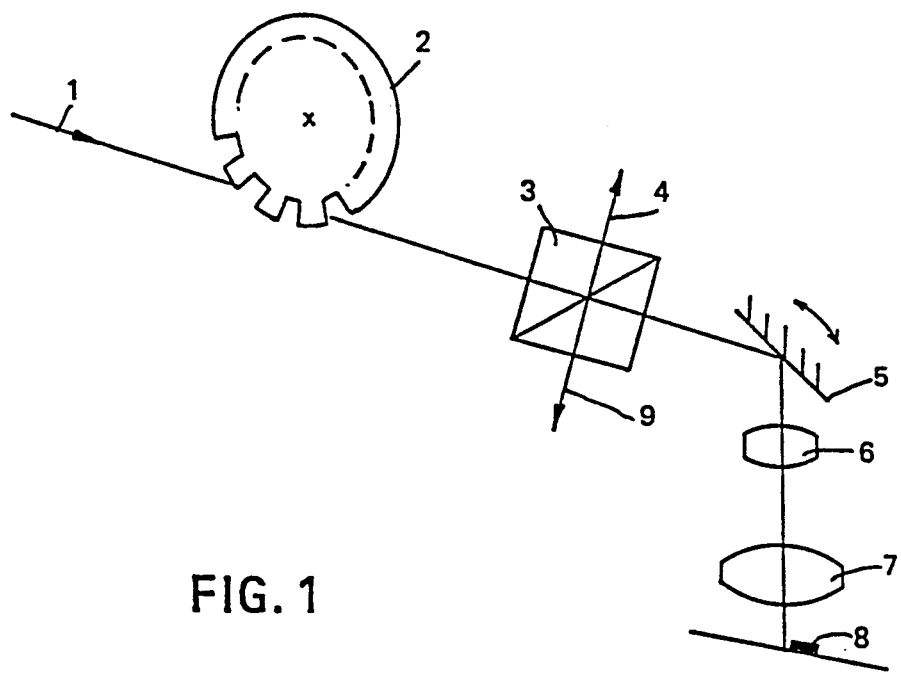
FIG. 1 is a schematic diagram of the optical arrangement using one laser scanning beam.

In FIG. 1 a light beam 1 is chopped into pulses by a rotating chopper wheel 2 which additionally provides the trigger pulses for the evaluation of the light reflected by the object. The chopped light beam 1 passes a beam splitter 3 which diverts part of the light of the light beam 1 as a reference light beam 4 which is sent to a photo detector 31, shown in FIG. 3. The residue of the chipped light beam 1 is directed via a scanning mirror 5, an ocular 6 and an objective 7 to a line 8 whose width is to be measured. The scanning mirror 5, the ocular 6 and the objective 7 are parts of common microscopes, spectrometers or similar optical devices. The scanning mirror causes the chopped light beam to scan across the line 8. The light reflected by the line 8 as the beam scans across the line returns along path 1 through ocular 6 and objective 7 until it reaches the beam splitter 3 which diverts a portion as measurement light beam 9 to a photo detector 30 shown in FIG. 3.

Figure 3:
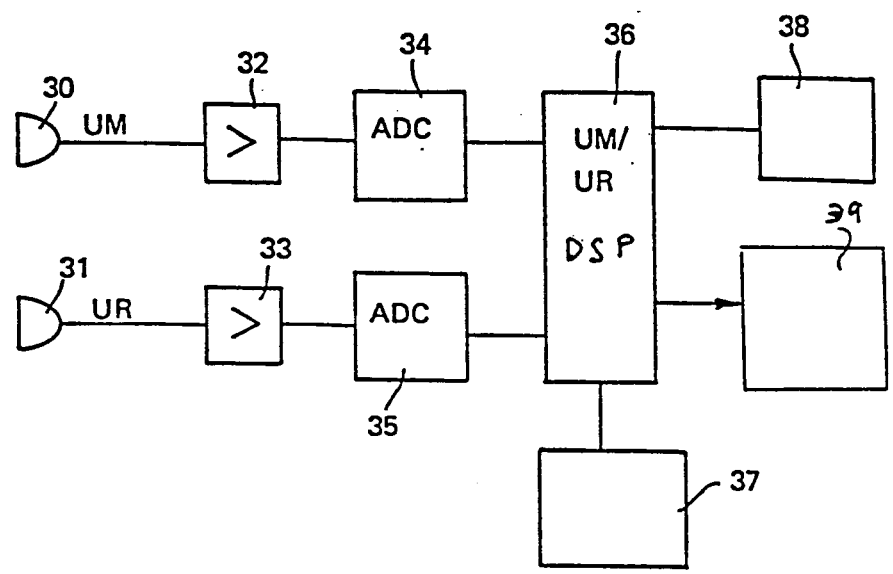
FIG. 3 is a block diagram showing the signal evaluation and processing.
Figure 2:
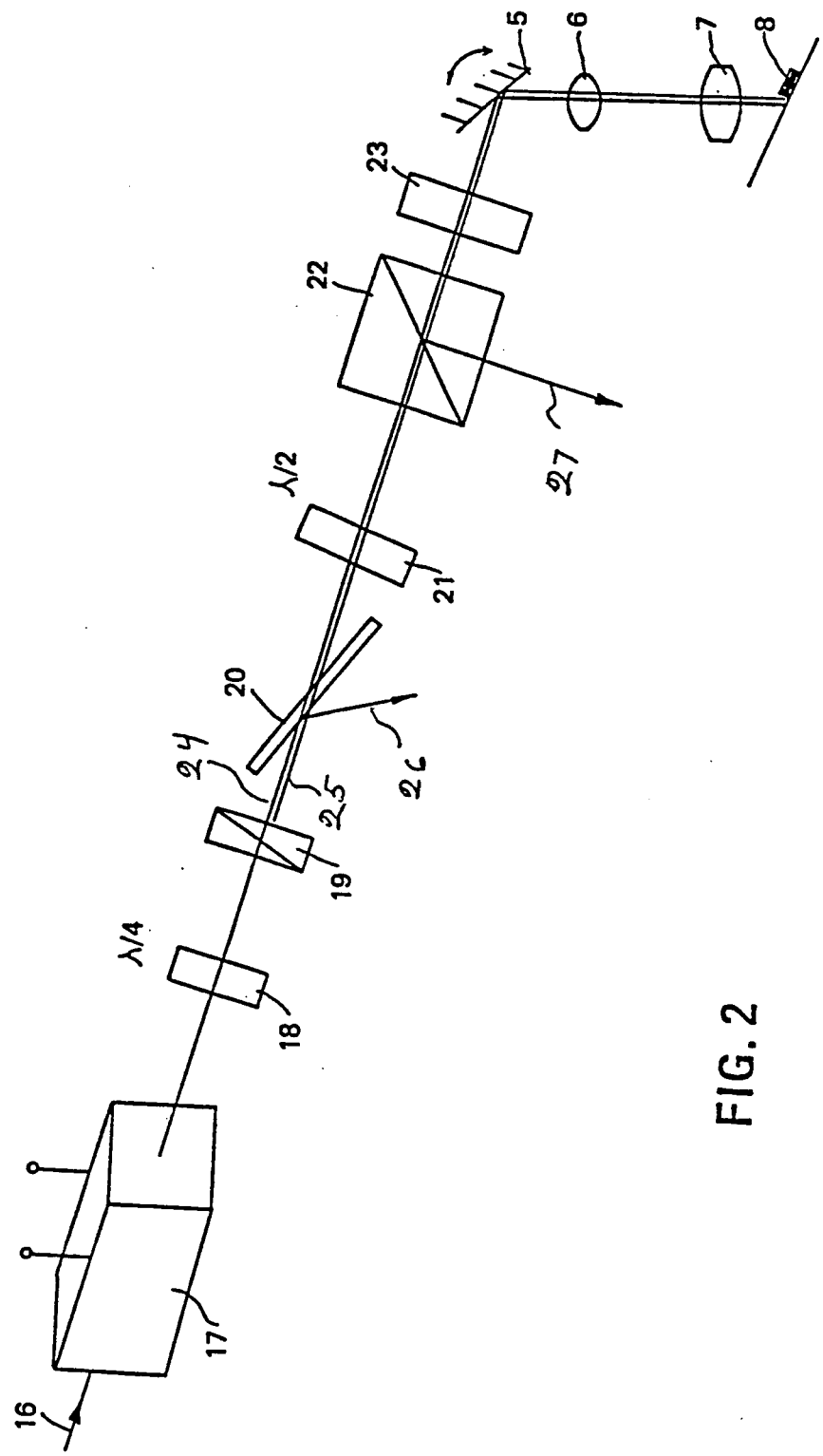
FIG. 2 is a schematic diagram of the optical arrangement using two laser scanning beams.

FIG. 2 shows a different embodiment for creating and directing two laser beams on the object being measured. In this FIG. 2 a linearly polarized laser beam 16 is directed to an electro-optical light modulator 17 which is triggered by a digital signal processor 36 (FIG. 3). The electro-optical light modulator 17 generates, in conjunction with a quarter-wave plate 18 and a ± quarter-wave voltage at the electro-optical light modulator 17, two waves which are linearly polarized at right angles to each other. The wavelength of the quarter-wave voltage is the wavelength of the laser light beam 16. In a Wollaston prism 19 the waves are deflected in different directions depending on the polarizing direction with a splitting angle of about one minute. This results in two partially overlapping beams 24 and 25 having a distance therebetween below the classic resolving power, i.e. less than 0.2 microns and is about 0.4 × wavelength/numerical aperture.

After leaving the Wollaston prism 19 the two beams 24 and 25 pass through a glass plate that is a beam splitter 20. Because the splitter 20 is inserted in the optical path at an angle of about 57 degrees (Brewster Angle) only part of one beam, i.e. beam 24 whose polarizing direction is perpendicular to the plane of incidence, is diverted as reference beam 26 and collected by detector 31 of FIG. 3. The other beam 25, having the other polarizing direction (parallel with the plane of incidence), is not reflected and passes fully through the splitter 20. The two beams 24 and 25 then continue and pass a half-wave plate 21 in order to turn the vibration direction of the beams such that an equal part of each beam passes without effect through a polarizing beam splitter 22. The beams 24 and 25 continue and pass through a quarter-wave plate 23 which effects the rotation of the vibration direction and a microscope comprising a scanning mirror 5, and ocular 6 and an objective 7 to focus the light on the object 8. The light reflected from the object 8 will be again rotated by plate 23 and directed as beam 27, by the beam splitter 22, to the photo detector 30 of FIG. 3.

FIG. 3 is a block diagram showing the signal processing system designed to receive the output of the photo detectors 30 and 31, collecting respectively from the apparatus shown in FIG. 1 the measurement light beam 9, and the reference light beam 4. Both photo detectors 30, and 31 generate an analog electrical signal and are coupled to tuned amplifiers 32 and 33, respectively. The tuned amplifiers 32 and 33 both have the same time constant and eliminate the high frequency noise and the DC component in each signal passing therethrough. The filtered signals from the tuned amplifiers 32 and 33 are digitized by analog/digital converters (ADC) 34 and 35, respectively. These converters digitize only the maximum and minimum values of each signal and then pass them to a digital signal processor (DSP) 36 connected to a position unit 37. Unit 37 supplies the DSP 36 with the current relative position between the scanning beam and the object being scanned and with a light pulse trigger unit 38 which controls the generation of light pulses by the chopper wheel 2 or the light modulator 17. The DSP 36, controls the synchronized processing of the beams by the analog/digital converters 34 and 35, the position unit 37 and the light pulse trigger unit 38. Data can be stored in a computer 39.

Figure 4A:
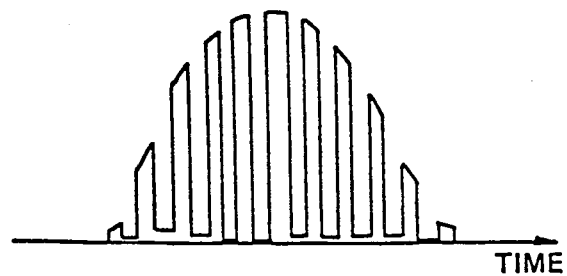
FIGS. 4a, 4b, 4c and 4d are diagrams showing the signal course and the detection of the line center using the single beam apparatus of FIG. 1, and FIG. 5a, 5b and 5c are diagrams showing the signal course and the detection of the line center using the two beam apparatus of FIG. 2.
Figure 4B:
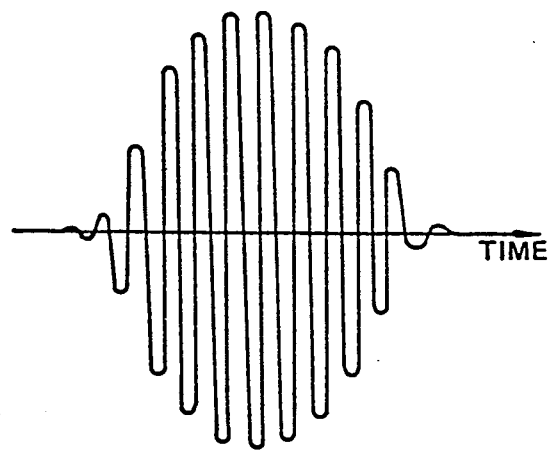
Figure 4C:
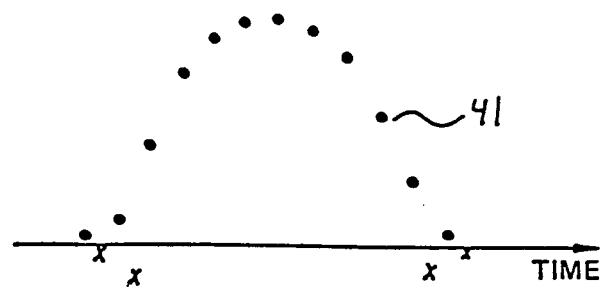
Figure 4D:
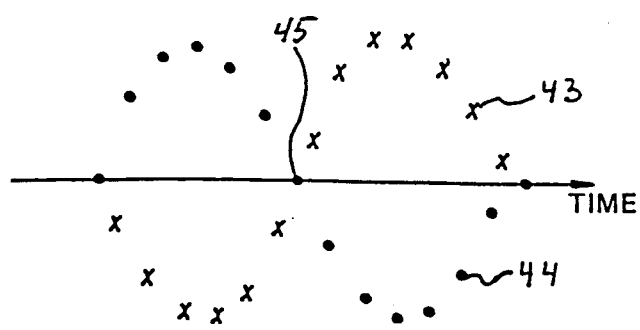

FIG. 4A shows the analog electrical measurement signal at the output of the photo detector 30 when using the chopped single beam generated by the apparatus shown in FIG. 1. After filtering this measurement signal by the tuned amplifier 32, the signal is as shown in FIG. 4B. A reference signal (not shown) similar to the signal shown in FIG. 4A is realized at the output of photo detector 31. This reference signal is then processed by the tuned amplifier 33 and a signal similar to that of FIG. 4B is realized. The maximum values and the minimum values of the measurement signal of FIG. 4B and the equivalent evaluated reference signal (not shown) are digitized and processed by the analog/digital converters 34 and 35 respectively and the digital signal processor 36 to eliminate the low frequency noise and to generate one measurement signal which forms two envelopes 41 and 42 according to FIG. 4C. The upper envelope 41 is the maximum values and the lower envelope 42 is the minimum values. The differences between corresponding points on the two envelopes are used to compute the curves 43 and 44 shown in FIG. 4D. FIG. 4D shows the difference quotient of the maximum values and the minimum values of the envelopes 41 and 42. The intersection point 45 of the two difference quotient curves 43 and 44 corresponds to and indicates the center of the line being measured.

Figure 5A:
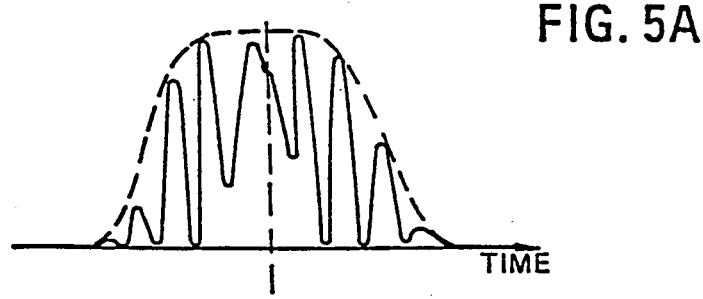
Figure 5B:
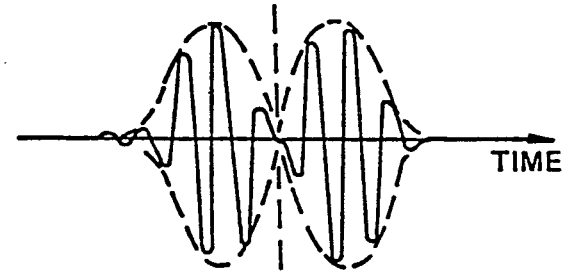
Figure 5C:
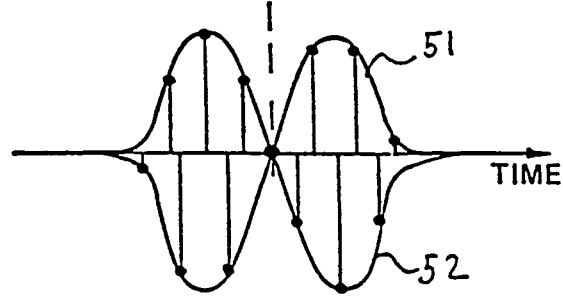

FIG. 5 discloses the signal evaluation of the method using two laser beams as would be obtained by using the apparatus shown in FIG. 2. FIG. 5A shows the measurement signal generated by the photodetector 30 when it receives the beam 27. Again, a reference signal generally similar to FIG. 5A is generated at the output of photo detector 31. After the elimination of any DC component and noise by the tuned amplifier 32, the signal according to FIG. 5B is obtained. Again, any reference beam 26 connected to a signal by detector 31 would be similarly processed by amplifier 33. Subsequently the maximum and minimum values of these signals (the measurement and the reference) are digitized and the envelope curves 51 and 52 shown in FIG. 5C generated. The intersection point of the curves shown in 5C corresponds to and indicates the center of the line being measured. The signals can be digitally filtered in order to eliminate remaining noise on the curves and more accurately determine the line center.

The methods and the apparatus described above allow the detection of the center of lines in the range of 0.25 to 35 micrometer in width, in real time with a precision of 3 sigma equal 12 to 17 nanometers. This is not obtainable with the methods and devices known in the art.

The inventive methods and the apparatus described above are not limited to the given particular embodiments which are only exemplary and the invention is to be limited only by the appended claims wherein

We claim:

1. A method for determining the center of a line formed on a workpiece comprising the steps of:
   creating a pair of laser beams,
   extracting a portion of one of said beams as a reference beam,
   directing said pair of laser beams on said workpiece bearing a line whose center is to be determined,
   scanning the line whose center is to be determined with said laser beams,
   developing an analog electrical measurement signal of the light reflected by the scanned line,
   developing an analog electrical reference signal of the reference beam,
   generating a filtered measurement signal by eliminating the DC component and the noise components of said electrical measurement signal,
   generating a filtered reference signal having maximum and minimum values,
   digitizing the maximum and minimum values of said filtered measurement signal,
   digitizing the maximum and minimum values of said reference signal,
   processing said digitized values of said reference and said measurement signals to generate two sine shaped curves, and
   determining the intersection point of said two curves which corresponds to the center of the scanned line.

2. The method according to claim 1 wherein:
   the extraction of the reference beam is accomplished by splitting at least one of said laser beams with a beam splitter.

3. The method according to claim 2 wherein the splitting of the beam is accomplished by a glass plate inserted in the optical path of said beam at the Brewster Angle.

4. Apparatus for optically determining the center of a line comprising:
   an optical imaging system including means for generating two laser beams,
   beam splitter means for splitting one of said laser beams to create a reference beam and guiding the reference beam to first receiving means,
   means for focussing said two beams on a line, whose center is to be determined with a distance therebetween the beams being about 0.2 microns,
   means for guiding the light reflected from said workpiece to a second receiving means,
   said first and second receiving means including photo detectors which provide a reference signal and a measurement signal respectively,
   means for scanning said beams across said workpiece,
   digital signal processing means coupled to said first and second receiving means for receiving and processing from said second receiving means said measurement signal and from said first receiving means said reference signal to determine the position of the line center as said beams are scanned across said line, and
   means for storing the position of the determined line center coupled to said digital signal processing means.

5. Apparatus as claimed in claim 4 wherein said digital signal processing means has coupled thereto a position unit for establishing the position of the beams on the workpiece.

6. Apparatus as claimed in claim 5 wherein said digital signal processing means has coupled thereto a trigger unit for pulsing said laser beam.

7. Apparatus as claimed in claim 5 wherein each of said first and second receiving means further include a tuned amplifier and an analog/digital converter coupled to the photo detector.

8. Apparatus as claimed in claim 5 wherein said beam splitter means comprises a glass plate inserted in the optical path of said beam.

9. A method for determining the center of a line on a workpiece by use of a light beam and the measurement of light reflected by the line on the workpiece comprising the following steps:
   generating a light beam,
   pulsing said light beam,
   splitting said light beam into a direct beam and a reference beam,
   directing and focussing the direct beam on a line on a workpiece,
   scanning said light beam across the line,
   collecting light reflected from the scanned line,
   developing an analog electrical measurement signal of the light reflected by the scanned line and an analog electrical reference signal of the reference beam,
   filtering said measurement signal and said reference signal by eliminating the DC and the noise components in said electrical measurement signal and in said electrical reference signal, respectively,
   generating a filtered measurement signal having maximum and minimum values,
   digitizing the maximum and minimum values of said filtered measurement signal and of said filtered reference signal,
   processing of said digitized values of said measurement signal and said reference signal to generate a correlated measurement signal and eliminating noise in said correlated signal,
   processing said digitized values of said correlated measurement signal to generate correlated sine shaped curves, a first of said sine shaped curves being generated by computing the difference quotient of the curve created by the digitized maximum values, and a second of said sine shaped curves by computing the difference quotient of the curve created by the digitized minimum values, and
   determining the intersection point of said sine shaped curves with the zero line to establish the center of the scanned line.

10. The method according to claim 9 wherein:
    said processing of said measurement signal include filtering of said measurement signal.

* * * * *